United States Patent
Shan et al.

(10) Patent No.: US 10,268,790 B2
(45) Date of Patent: Apr. 23, 2019

(54) ONLINE MONITORING UNIT AND CONTROL CIRCUIT FOR ULTRA-WIDE VOLTAGE RANGE APPLICATIONS

(71) Applicant: Southeast University, Nanjing (CN)

(72) Inventors: Weiwei Shan, Nanjing (CN); Wentao Dai, Nanjing (CN); Jun Yang, Nanjing (CN); Longxing Shi, Nanjing (CN)

(73) Assignee: Southeast University, Nanjing (CN)

( * ) Notice: Subject to any disclaimer, the term of this patent is extended or adjusted under 35 U.S.C. 154(b) by 0 days.

(21) Appl. No.: 15/560,161

(22) PCT Filed: Feb. 24, 2017

(86) PCT No.: PCT/CN2017/074746
§ 371 (c)(1),
(2) Date: Sep. 21, 2017

(87) PCT Pub. No.: WO2018/000839
PCT Pub. Date: Jan. 4, 2018

(65) Prior Publication Data
US 2018/0253521 A1    Sep. 6, 2018

(30) Foreign Application Priority Data
Jun. 27, 2016 (CN) .......................... 2016 1 0481031

(51) Int. Cl.
*G06F 17/50* (2006.01)
*H03K 5/19* (2006.01)
*H03K 5/1534* (2006.01)

(52) U.S. Cl.
CPC ...... *G06F 17/5045* (2013.01); *G06F 17/5031* (2013.01); *H03K 5/1534* (2013.01); *H03K 5/19* (2013.01); *G06F 2217/84* (2013.01)

(58) Field of Classification Search
CPC ............ G06F 17/5045; G06F 2217/84; G06F 17/5031
(Continued)

(56) References Cited

U.S. PATENT DOCUMENTS

| 7,496,788 B1 * | 2/2009 | Alfieri et al. ....... G06F 11/0751 713/323 |
| 2018/0253521 A1 * | 9/2018 | Shan et al. .......... G06F 17/5031 |

FOREIGN PATENT DOCUMENTS

| CN | 101714397 A | 5/2010 |
| CN | 202433800 U | 9/2012 |

(Continued)

*Primary Examiner* — Sun J Lin
(74) *Attorney, Agent, or Firm* — Gokalp Bayramoglu

(57) ABSTRACT

An online monitoring unit and a control circuit for ultra-wide voltage range applications are disclosed. Compared with a conventional online monitoring unit, present invention eliminates a need to reserve delay units, replaces flip-flops in the conventional online monitoring unit with a latch, and uses a transition detector with fewer transistors than that of a shadow latch in the conventional online monitoring unit, thereby reducing an area and a power consumption of the online monitoring unit significantly and improving an energy efficiency of online monitoring techniques. In addition, in the ultra-wide voltage range applications, a time borrowing property of the latch adopted by the present invention can be utilized to prevent a timing error caused by process-voltage-temperature (PVT) variations, thus enabling a minimization of a timing margin and ensuring a higher power efficiency. The present invention also discloses a control circuit for use with the online monitoring unit.

6 Claims, 3 Drawing Sheets

(58) Field of Classification Search
USPC .................................................. 716/100, 101
See application file for complete search history.

(56) References Cited

FOREIGN PATENT DOCUMENTS

| | | |
|---|---|---|
| CN | 105159374 A | 12/2015 |
| CN | 105183062 A | 12/2015 |
| CN | 105191127 A | 12/2015 |
| CN | 106100617 A | 11/2016 |
| WO | 2008015494 A1 | 2/2008 |

\* cited by examiner

ONLINE MONITORING UNIT AND CONTROL CIRCUIT FOR ULTRA-WIDE VOLTAGE RANGE APPLICATIONS

CROSS REFERENCE TO RELATED APPLICATIONS

This application is the national phase entry of International Application PCT/CN2017/074746, filed on Feb. 24, 2017, which is based upon and claims priority to Chinese Patent Application No. CN 201610481031.2, filed on Jun. 27, 2016, the entire contents of which are incorporated herein by reference.

TECHNICAL FIELD

The present invention relates to the field of low-power IC design, and more particularly to the adaptive voltage and frequency scaling based on online timing monitoring.

BACKGROUND

The advanced manufacturing process has progressed into nm-scale thanks to rapid development of IC technology. While the functions of System on Chip (SoC) chips become more and more powerful, high performance and low power consumption remain two main goals to be achieved. However, the two goals are paradoxical in that too low power consumption could greatly degrade the performance. The researches show that, circuits in the advanced process usually achieve the lowest power consumption in the sub-threshold region, and achieve the highest energy efficiency in the near-threshold region; and when the supply voltage decreases from the normal voltage region (or super-threshold region, STC) through the near-threshold region down to the sub-threshold region, the circuit delay continually increases and decreases exponentially in the near-threshold region and sub-threshold region, while the energy efficiency increases at first and then decreases, and optimal energy efficiency is achieved in the near-threshold region. To balance the energy efficiency and performance, much attention has been paid to the wide-voltage-range circuits, which generally cover a range from the near/sub-threshold region to the normal voltage region and can switch in this wide voltage range to meet high performance or high energy-efficiency requirements on chips under different loads.

However, some unsolved critical problems still exist in SoC circuits when operating at near-threshold and wide-voltage-range region: in the normal voltage region, owing to process, voltage, temperature (PVT) variations caused by continual shrinkage in process size, certain timing margin has to be reserved in the conventional VLSI design to accommodate the timing constraint in the worst-case scenario. In addition, in the near-threshold voltage region, the PVT variations have greater impact on the circuit delay, leading to a multiplied path delay variation in addition to performance degradation (generally, $\frac{1}{10}$ of that at a normal voltage) caused by the decreasing voltage of a circuit. Therefore, in the near-threshold or wide-voltage-range operation design, more timing margin than that of a conventional design has to be reserved to cope with timing variation in the near-threshold region. However, such timing margin may lead to excessively conservative setting of the operating voltage or frequency of a circuit, and may even counteract the energy efficiency benefits brought about by the wide-voltage-range operating.

The online monitoring techniques can use an on-chip monitoring unit to monitor critical path timing and scale in real time the voltage and frequency of a chip, thus becoming a powerful approach to address the bottleneck in the wide voltage range design. The online timing monitoring techniques can be mainly categorized into two types: error detection and correction, and timing warning. A timing warning-type monitoring unit is preferred because it does not need an additional system-level recovery mechanism, and predicts potential timing condition of a circuit by manually adding additional delays to critical data paths, thereby achieving voltage and frequency adjustment in advance and preventing recovery overheads incurred by real faults.

During adjustment for ultra-wide voltage range applications, the conventional online monitoring unit cannot cover the variations since the variations have greater impact on delay distribution at a low voltage. Further, to deal with greater variations at a low voltage, a larger speculation window needs to be reserved on the monitoring unit, and thus more delay units are added in the conventional monitoring unit to ensure an adequate size of the speculation window, which leads to greater area and power overheads and reduces the benefits from the online timing monitoring techniques. As a result, it is necessary to design an online monitoring unit with smaller area and lower power consumption.

SUMMARY OF THE INVENTION

In view of the problems and disadvantages of the monitoring unit in an adaptive voltage adjustment system based on online timing monitoring in an IC of a wide voltage range, an objective of the present invention is to design a monitoring unit with the capable of effectively monitoring circuit timing in an ultra-wide voltage range and smaller area and lower power consumption than a conventional monitoring unit. Accordingly, the present invention also provides a control circuit for the monitoring unit to achieve more effective online timing monitoring.

To achieve the above objective, the present invention designs an online monitoring unit and a control circuit for ultra-wide voltage range applications. The monitoring unit functions to monitor data transmission of registers at the end of critical paths. When the circuit timing is tense, data arrives near a positive edge of a clock and even arrives after the positive edge, which leads to a timing error. By monitoring data transition of the registers at the end of the critical paths during a positive clock phase, it is determined whether the circuit timing is tense. When data transition occurs during the positive clock phase, the monitoring unit outputs a high-level timing warning signal. Compared with a conventional monitoring unit, the online monitoring unit uses a transition detector, flip-flops in the conventional monitoring unit are replaced with a latch, and the timing warning signal of the monitoring unit is processed and controlled by the control circuit.

Input signals of the online monitoring unit are a clock signal CLK and a data input signal Din, and output signals of the online monitoring unit are a data output signal Q and a timing warning signal Pre_error. The data input signal is connected to data input ends of the latch and the transition detector, the clock input signal is connected to clock input ends of the latch and the transition detector, the output of the latch serves as data output of the monitoring unit, and the output of the transition detector serves as an output timing warning signal.

The transition detector of the online monitoring unit consists of five NMOS transistors, three PMOS transistors, and three inverters. The clock signal CLK is connected to a gate of the PMOS transistor MP1, a source of the PMOS transistor MP1 is connected to a power supply VDD, and a drain of the PMOS transistor MP1 is connected to a source of the PMOS transistor MP2, a source of the PMOS transistor MP3, a drain of the NMOS transistor MN1, and a drain of the NMOS transistor MN4 and is also connected to an input end of the inverter INV1. The data input signal Din is connected to gates of the PMOS transistor MP2 and the NMOS transistor MN2 and is also connected to an input end of the inverter INV2, a drain of the PMOS transistor MP2 is connected to a source of the NMOS transistor MN1 and a drain of the NMOS transistor MN2 and is also connected to gates of the PMOS transistor MP3 and the NMOS transistor MN3, a drain of the PMOS transistor MP3 is connected to a drain of the NMOS transistor MN3 and a gate of the NMOS transistor MN4 and is also connected to an input end of the inverter INV3, and a source of the NMOS transistor MN4 is connected to a drain of the NMOS transistor MN5. Sources of the NMOS transistor MN2, the NMOS transistor MN3 and the NMOS transistor MN5 are grounded. The output of the inverter INV3 is connected to a gate of the NMOS transistor MN1, the output of the inverter INV2 is connected to a gate of the NMOS transistor MN5, the inverters INV1, INV2 and INV3 are supplied with the power supply VDD, and the output of the inverter INV1 is the timing warning signal Pre_error.

The control circuit of the online monitoring unit for ultra-wide voltage range applications consists essentially of three parts: an N-input dynamic OR gate, a signal acquisition module, and a control signal generation module. The N-input dynamic OR gate receives in real time N (N<=10) timing warning signals (Pre_error01~Pre_errorN) generated by the monitoring units at the end of N critical paths and performs an OR operation on the signals. When N>10, a plurality of N-input dynamic OR gates is needed to perform multi-stage OR operations. Finally, a general timing warning signal (Or_error) is generated and is transmitted to the signal acquisition module. The signal acquisition module acquires the general timing warning signal from the N-input dynamic OR gate and transmits the acquired signal to a next-stage circuit. Upon receiving the general timing warning signal (Or_error), the control signal generation module generates and feeds back a corresponding switch control signal (irstn) to the N-input dynamic OR gate for controlling the N-input dynamic OR gate. When irstn is set to 1, the N-input dynamic OR gate is on, and the OR operation is performed in real time; when irstn is set to 0, the N-input dynamic OR gate is off, and a low-level output is obtained.

The N-input dynamic OR gate consists of two PMOS transistors, N+1 NMOS transistors, and an inverter. Gates of the NMOS transistors M1 to MN are respectively connected to the N timing warning signals (Pre_error01~Pre_errorN), sources of the NMOS transistors M1 to MN are connected to a drain of the NMOS transistor M0, a source of the NMOS transistor M0 is connected to the ground VSS, and a gate of the NMOS transistor M0 is connected to the switch control signal (irstn). Drains (V0) of the NMOS transistors M1 to MN are connected to drains (V0) of the PMOS transistor MP0 and the PMOS transistor MP4 and also serve as inputs of the inverter INV, the power supply VDD is connected to sources of the PMOS transistor MP0 and the PMOS transistor MP4, and a gate of the PMOS transistor MP4 is connected to the switch control signal (irstn). The output of the inverter (INV) is connected to a gate of the PMOS transistor MP0, and the output of the inverter INV is the general timing warning signal (Or_error).

The signal acquisition module consists essentially of a negative-edge-sampling flip-flop with a reset terminal, a clock input signal of the flip-flop (DFF1) is a system clock signal, a reset input signal is a system reset signal, the data input is the output signal (Or_error) of the dynamic OR gate, and the output of the flip-flop (DFF1) is a sampled signal (Err) of the general timing warning signal and the sampled signal is finally output to a next-stage circuit.

The control signal generation module consists of an inverter and a negative-edge-sampling flip-flop with a reset terminal, the output signal (Or_error) from the dynamic OR gate passes through an inverter, the output of the inverter serves as the data input of the flip-flop (DFF2), a clock input signal of the flip-flop (DFF2) is a system clock signal, a reset input signal is a system reset signal, and the output of the flip-flop (DFF2) is the switch control signal (irstn) for the N-input dynamic OR gate.

Compared with a conventional online monitoring unit, the present invention eliminates the need to reserve delay units, replaces flip-flops in the conventional online monitoring unit with a latch, and uses a transition detector with fewer transistors than that of a shadow latch in the conventional online monitoring unit, thereby reducing the area and the power consumption of the online monitoring unit significantly and improving the energy efficiency of online monitoring techniques. In addition, in the ultra-wide voltage range applications, the time borrowing property of the latch adopted by the present invention can be utilized to prevent a circuit timing error caused by PVT variations, thus enabling the minimization of timing margin and ensuring higher power efficiency.

DETAILED DESCRIPTION OF THE INVENTION

The technical solutions of the present invention are described in detail hereinafter with reference to the accompanying drawings, and the protection scope of the present invention is not limited by the embodiments.

Figure 1:
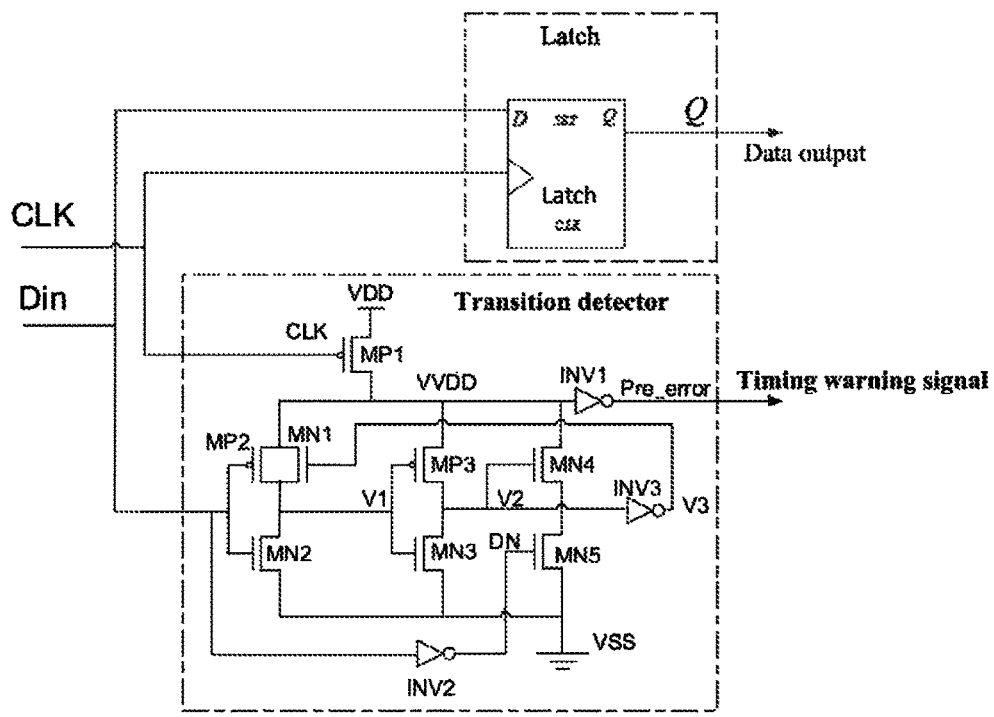
FIG. 1 is a structural diagram of a monitoring unit.

As shown in FIG. 1, an online monitoring unit for ultra-wide voltage range applications generally comprises: a latch and a transition detector. When an input signal Din arrives later than a positive edge of a next clock cycle, since flip-flops have been replaced with a latch having the time borrowing property, correct data can still be transmitted to a next-stage flip-flop through the latch even if the data has arrived later than the positive edge of the clock, such that timing violation is not caused. Therefore, the online monitoring unit can prevent a timing error caused by PVT variations.

As for the transition detector, when a clock signal CLK is at a low level, a PMOS transistor (MP1) is turned on, a drain (VVDD) of MP1 is charged to a high level by a power supply, and a low-level output is obtained after inversion of an inverter (INV1).

When the clock signal CLK is at a high level, the PMOS transistor (MP1) is turned off, and:

(1) When the data signal Din remains at "0", gates (V1) of MOS transistors MP3 and MN3 are at "1", drains (V2) of MP3 and MN3 are at "0", and the output (V3) of an inverter INV3 is at "1". When the data signal Din transitions from "0" to "1", a PMOS transistor MP2 is turned off gradually and an NMOS transistor MN2 is turned on gradually. In this case, since the output (V3) of the inverter INV3 is at a high level, the NMOS transistor MN1 is turned on, and thus a closed circuit is formed, through which the drain (VVDD) of the PMOS transistor MP1 is discharged through the MOS transistors MP2, MN1 and MN2 to the ground VSS, the charges stored in the drain (VVDD) are released, and the charges stored in the gates (V1) of the MOS transistors MP3 and MN3 are also released completely via the closed circuit. Since a source (VVDD) of the PMOS transistor MP3 is not charged, the drain (V2) of MP3 cannot be charged and remains at a low level, the output (V3) of the inverter INV3 remains at a high level, the charges stored in the drain of the PMOS transistor MP1 are eventually released completely, and the output (Pre_error) obtained after inversion of the inverter INV1 transitions to a high level; and (2) When the data signal Din remains at "1", the PMOS transistor MP2 is turned off, the gates (V1) of the MOS transistors MP3 and MN3 are at "0", the drains (V2) of MP3 and MN3 are at "1", the output (V3) of the inverter INV3 is at "0", and the NMOS transistor MN1 is turned off. When the data signal Din transitions from "1" to "0", the output DN obtained after inversion of an inverter INV2 transitions from "0" to "1", and an NMOS transistor MN5 is turned on gradually. In this case, since the drain (V2) of the PMOS transistor MP3 is at "1", an NMOS transistor MN4 is turned on, and thus a closed circuit is formed, through which the drain (VVDD) of the PMOS transistor MP1 is discharged through the NMOS transistors MN4 and MN5, the PMOS transistor MP3 is turned on, and a part of the charges stored in the drain (V2) of MP3 are transferred to its source (VVDD). However, owing to the threshold loss of PMOS transistors, a part of the charges will always remain in the drain (V2) and can be used for turning on the NMOS transistor MN4, such that all the charges stored in the drain of the PMOS transistor MP1 are gradually released in the end, and the output (Pre_error) obtained after inversion of the inverter INV1 transitions to a high level.

Therefore, during a positive clock phase, the transition detector detects the transition of the input signal and outputs a high-level timing warning signal. As a result, it can be determined whether data arrives late by monitoring data transition during the positive clock phase. When data transition occurs during the positive clock phase, the online monitoring unit outputs a high-level timing warning signal.

Figure 2:
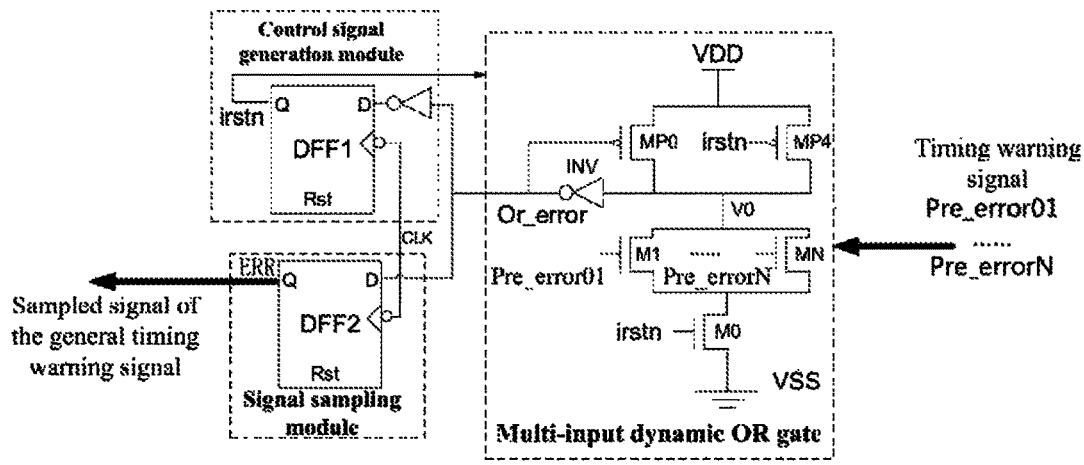
FIG. 2 is a structural diagram of a control circuit.

As shown in FIG. 2, a control circuit of the online monitoring unit consists essentially of three parts: an N-input dynamic OR gate, a signal acquisition module, and a control signal generation module. The N-input dynamic OR gate receives in real time a plurality of timing warning signals (Pre_error01~Pre_errorN) generated by the monitoring units and transmits, to the signal acquisition module, a general timing warning signal (Or_error) generated after an OR operation is performed on the timing warning signals; the signal acquisition module acquires the general timing warning signal transmitted from the N-input dynamic OR gate, and transmits the acquired signal to a next-stage circuit. Upon receiving a high-level general timing warning signal (Or_error) transmitted from the N-input dynamic OR gate, the control signal generation module generates and feeds back a low-level switch control signal (irstn) to the N-input dynamic OR gate for switching on/off the N-input dynamic OR gate. If the control signal generation module receives a low-level signal (Or_error) transmitted from the N-input dynamic OR gate, the output switch control signal (irstn) is at a high level.

Figure 3:
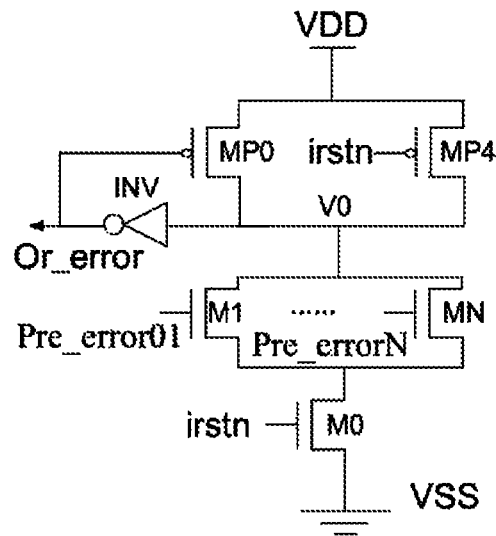
FIG. 3 is a structural diagram of an N-input dynamic OR gate.

FIG. 3 illustrates an N-input dynamic OR gate. When the switch control signal (irstn) is at a low level, a PMOS transistor MP4 is turned on, a drain (V0) of MP4 is charged to a high level, a low-level output is obtained after inversion of the inverter (INV), and the output of the N-input dynamic OR gate is at a low level, which is equivalent to a situation that the N-input dynamic OR gate is off. When the switch control signal (irstn) is at a high level, the PMOS transistor MP4 is turned off, and the NMOS transistor M0 is turned on. At this time, if any one of the timing warning signals Pre_error01~Pre_errorN is at a high level, the corresponding NMOS transistor is turned on, the charges in the drain (V0) are completely released, a high-level output is obtained after inversion of the inverter (INV), and the output of the N-input dynamic OR gate remains at a high level till the switch control signal (irstn) is set to "0", which is equivalent to a situation that the N-input dynamic OR gate is on and the logical "OR" function is achieved.

Figure 4:
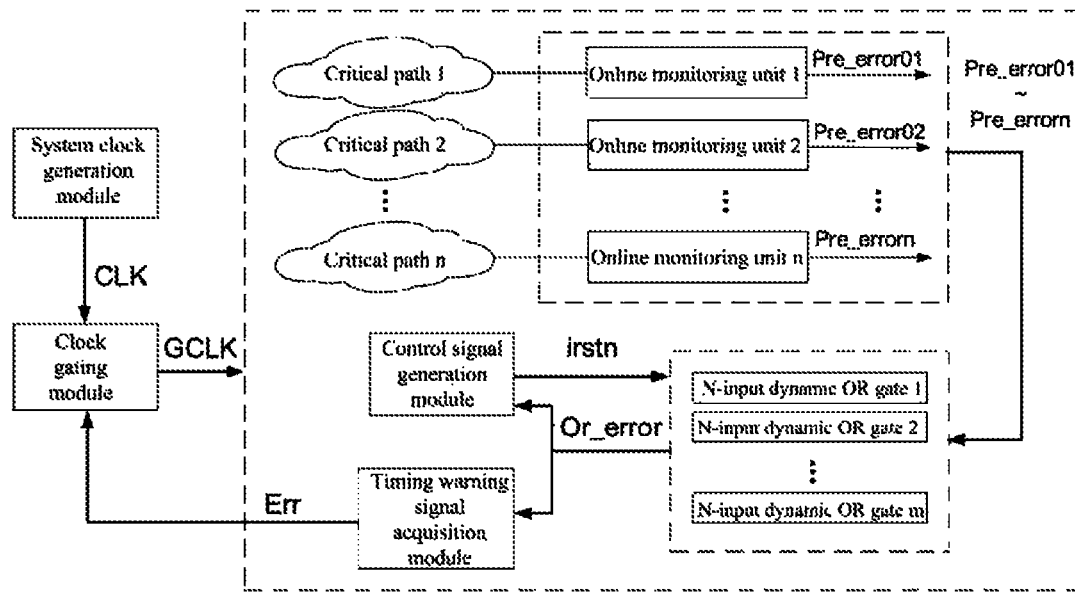
FIG. 4 is a system diagram of a clock gating circuitry in which the online monitoring unit and the control circuit are applied.

The online monitoring unit and the control circuit are integrated with a clock gating technique. When a clock gating module receives the timing warning signal output from the online monitoring unit and the control circuit, the clock will be disabled for one cycle to prevent continual time borrowing, so as to ensure correct system timing. A block diagram is shown in FIG. 4. The online monitoring units are inserted at the end of n selected critical paths, where n>=N in general cases. The resultant n timing warning signals (pre_error01~pre_errorn) are connected to a plurality of N-input dynamic OR gates (if n<=N, only one N-input dynamic OR gate is needed). The outputs of the plurality of N-input dynamic OR gates are then connected to a common OR gate to output a general timing warning signal (Or_error) which is further transmitted to the timing warning signal acquisition module and the control signal generation module. When the circuit timing is tense, data passes through the critical path to reach the online monitoring unit after the positive edge of the clock. The online monitoring unit detects the late data and immediately generates a timing warning signal which is input to the clock gating module via the N-input dynamic OR gate and the timing warning signal acquisition module. Upon receiving the sampled timing warning signal, the clock gating module gates the system clock CLK, i.e., disabling the clock for one cycle, outputs the gated clock GCLK, and recovers the clock after data is transmitted correctly, thus ensuring correct system timing.

In one embodiment of the online monitoring unit and the control circuit for ultra-wide voltage range applications, the clock gating technique is incorporated to design a circuit system. The design employs an N-input dynamic OR gate with N=10, and is based on a SMIC 40 nm process library at a process corner TT and at 25° C.

Figure 5:
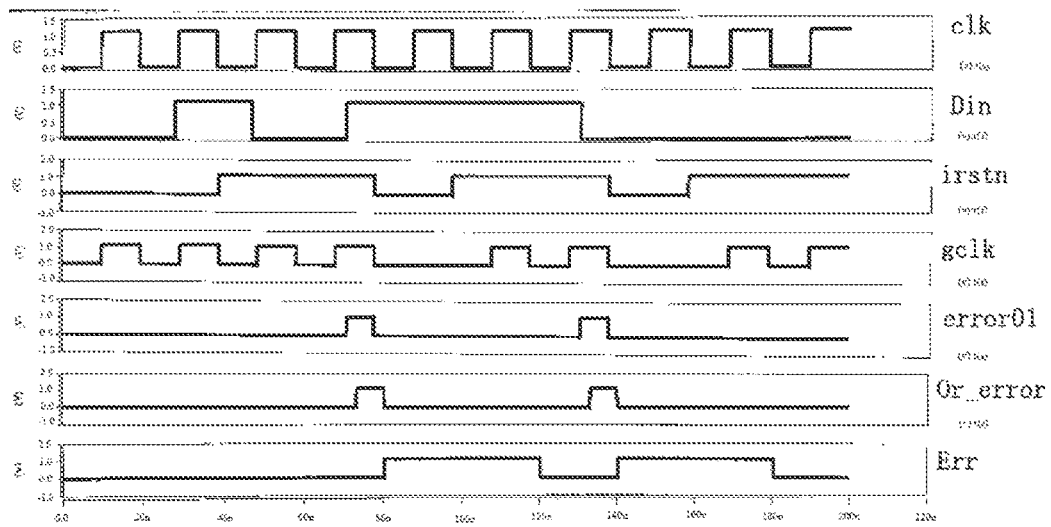
FIG. 5 is a diagram illustrating the overall adjustment effect of the monitoring unit and the control circuit at a normal voltage.

FIG. 5 is a diagram illustrating the overall adjustment effect of the monitoring unit and the control circuit at a normal voltage of 1.1 V. In FIG. 5, clk represents the system clock signal, Din represents the data input signal, gclk represents the clock signal processed with the clock gating technique, error01 represents the timing warning signal output by the online monitoring unit, irstn represents the switch control signal generated by the control signal generation module, Or_error represents the timing warning signal processed by a 10-input dynamic OR gate, and Err represents the timing warning signal sampled by the sampling module. As shown in FIG. 5, during a negative clock phase, transition of data Din occurs, and the timing warning signal output by the online monitoring unit is at "0"; while during a positive clock phase, data Din transitions from "0" to "1" or from "1" to "0", the timing warning signal output by the online monitoring unit is at "1", the 10-input dynamic OR gate performs an OR operation and outputs "1", the signal sampling module samples the timing warning signal and outputs the sampled signal to a next-stage circuit, the control signal generation module outputs a switch control signal at "0" upon sampling of the timing warning signal, then the output of the 10-input dynamic OR gate is set to "0", and the clock gating module samples the timing warning signal and disables the clock for one cycle to avoid the propagation of time borrowing, thus completing the circuit control.

Figure 6:
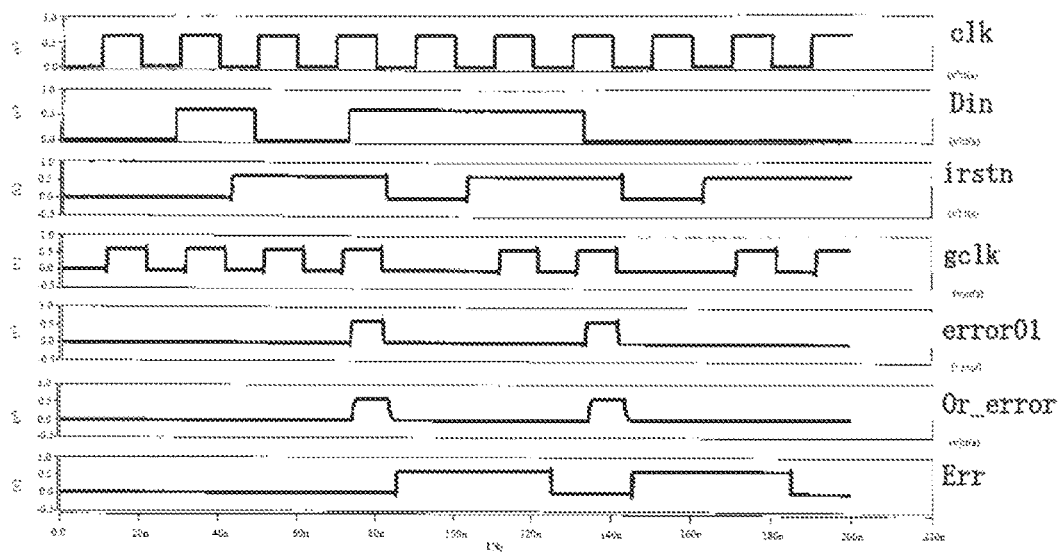
FIG. 6 is a diagram illustrating the overall adjustment effect of the monitoring unit and the control circuit at a low voltage.

FIG. 6 is a diagram illustrating the overall adjustment effect of the monitoring unit and the control circuit at a low voltage of 0.6 V, in which the online monitoring techniques are integrated with the clock gating technique. The design employs an N-input dynamic OR gate with N=10 and a SMIC 40 nm process library at a process corner SS and at 25° C. Similar to the case in FIG. 5, the system performs well at 0.6 V. When data transition occurs during the positive clock phase, the online monitoring unit outputs a high-level timing warning signal, and the 10-input dynamic OR gate receives and transmits the signal to the next-stage signal sampling module, control signal generation module, and clock gating module, thereby completing the control.

It can be seen from FIG. 5 and FIG. 6 that, the present invention is applied in practical predictive on-chip monitoring technologies, and can be integrated with the clock gating technique to perform clock adjustment in accordance with the actual performance of a circuit, thereby minimizing timing margin and reducing power consumption while maintaining proper functions of the circuit.

What is claimed is:

1. An online monitoring unit for ultra-wide voltage range applications, the online monitoring unit consisting of a latch and a transition detector, wherein a plurality of input signals of the online monitoring unit include a clock signal and a data input signal, and a plurality of output signals of the online monitoring unit include a data output signal and a timing warning signal, wherein the data input signal is connected to a data input end of each of the latch and the transition detector, the clock signal is connected to a clock input end of each of the latch and the transition detector, an output of the latch is the data output signal, and an output of the transition detector is the timing warning signal;

wherein, the transition detector consists of five NMOS transistors, three PMOS transistors, and three inverters, wherein the clock signal is connected to a gate of a first PMOS transistor, a source of the first PMOS transistor is connected to a first power supply, and a drain of the first PMOS transistor is connected to a source of a second PMOS transistor, a source of a third PMOS transistor, a drain of a first NMOS transistor and a drain of a fourth NMOS transistor and is also connected to an input end of a first inverter; the data input signal is connected to the gate of each of the second PMOS transistor and a second NMOS transistor and the data input signal is also connected to an input end of a second inverter; a drain of the second PMOS transistor is connected to a source of the first NMOS transistor, a drain of the second NMOS transistor and to the gates of the third PMOS transistor and a third NMOS transistor; a drain of the third PMOS transistor is connected to a drain of the third NMOS transistor and a gate of the fourth NMOS transistor and the drain of the third PMOS transistor is also connected to an input end of a third inverter, and a source of the fourth NMOS transistor is connected to a drain of a fifth NMOS transistor; the sources of the second NMOS transistor, the third NMOS transistor and the fifth NMOS transistor are grounded; an output of the third inverter is connected to a gate of the first NMOS transistor, an output of the second inverter is connected to a gate of the fifth NMOS transistor, each of the first inverter, the second inverter, and the third inverter is supplied with the first power supply, and an output of the first inverter is the timing warning signal.

2. A control circuit of an online monitoring unit for ultra-wide voltage range applications, the control circuit consisting essentially of an N-input dynamic OR gate, a signal acquisition module, and a control signal generation module, wherein the N-input dynamic OR gate receives a plurality of in-real-time N timing warning signals generated by the online monitoring unit at an end of each critical path of N critical paths and the N-input dynamic OR gate performs an OR operation on the plurality of real-time N timing warning signals, wherein N is a predefined integer, a general timing warning signal is generated, and the general timing warning signal is transmitted to the signal acquisition module and the control signal generation module; the signal acquisition module acquires the general timing warning signal and transmits a sampled signal to a next-stage circuit; upon receiving the general timing warning signal, the control signal generation module generates a switch control signal for controlling the N-input dynamic OR gate.

3. The control circuit according to claim 2, wherein the N-input dynamic OR gate consists of two PMOS transistors, N+1 NMOS transistors, and an inverter, wherein a gate of each NMOS transistor of a plurality of NMOS transistors numbered from 1 to N is respectively connected to the plurality of real-time N timing warning signals, a source of each NMOS transistor of the plurality of NMOS transistors numbered from 1 to N is connected to a drain of a NMOS transistor numbered as zero, a source of the NMOS transistor numbered as zero is connected to a ground, and a gate of the NMOS transistor numbered as zero is connected to a switch control signal; a plurality of drains of the plurality of NMOS transistors numbered from 1 to N are connected to a plurality of drains of a first PMOS transistor and a second PMOS transistor and the plurality of drains of the plurality of NMOS transistors numbered from 1 to N also serve as a plurality of inputs of the inverter, a power supply is connected to a plurality of sources of the first PMOS transistor and the second PMOS transistor, and a gate of the second PMOS transistor is connected to the switch control signal; an output of the inverter is connected to a gate of the first PMOS transistor, and the output of the inverter is the general timing warning signal.

4. The control circuit according to claim 3, wherein:
the control signal generation module consists of an inverter and a negative-edge-sampling flip-flop with a reset terminal, the general timing warning signal serves as an input of the inverter, an output of the inverter serves as a data input of the negative-edge-sampling flip-flop, a clock input signal of the negative-edge-sampling flip-flop is a system clock signal, a reset input signal is a system reset signal, and an output of the negative-edge-sampling flip-flop is the switch control signal.

5. The control circuit according to claim 2, wherein:
the signal acquisition module is a negative-edge-sampling flip-flop with a reset terminal, in the signal acquisition module, a clock input signal is a system clock signal, a reset input signal is a system reset signal, a data input is the general timing warning signal, and a data output is a sampled signal of the general timing warning signal.

6. An online timing monitoring system, comprising an online monitoring unit, wherein,
the online monitoring unit consists of a latch and a transition detector, wherein a plurality of input signals of the online monitoring unit include a clock signal and a data input signal, and a plurality of output signals of the online monitoring unit include a data output signal and a timing warning signal, wherein the data input signal is connected to a data input end of each of the latch and the transition detector, the clock signal is connected to a clock input end of each of the latch and the transition detector, an output of the latch is the data output signal, and an output of the transition detector is the timing warning signal;

wherein, the transition detector consists of five NMOS transistors, three PMOS transistors, and three inverters, wherein the clock signal is connected to a gate of a first PMOS transistor, a source of the first PMOS transistor is connected to a first power supply, and a drain of the first PMOS transistor is connected to a source of a second PMOS transistor, a source of a third PMOS transistor, a drain of a first NMOS transistor and a drain of a fourth NMOS transistor and is also connected to an input end of a first inverter; the data input signal is connected to a gate of the second PMOS transistor and a gate of a second NMOS transistor, and the data input signal is also connected to an input end of a second inverter, a drain of the second PMOS transistor is connected to a source of the first NMOS transistor and a drain of the second NMOS transistor and is also connected to a gate of the third PMOS transistor and a gate of a third NMOS transistor, a drain of the third PMOS transistor is connected to a drain of the third NMOS transistor and a gate of the fourth NMOS transistor, and the drain of the third PMOS transistor is also connected to an input end of a third inverter, and a source of the fourth NMOS transistor is connected to a drain of a fifth NMOS transistor; sources of the second NMOS transistor, the third NMOS transistor and the fifth NMOS transistor are grounded; an output of the third inverter is connected to a gate of the first NMOS transistor, an output of the second inverter is connected to a gate of the fifth NMOS transistor, each of the first inverter, the second inverter, and the third inverter is supplied with the first power supply, and an output of the first inverter is the timing warning signal.

* * * * *